(12) United States Patent
Trivedi

(10) Patent No.: US 7,054,866 B2
(45) Date of Patent: May 30, 2006

(54) SYSTEMS AND METHODS FOR COMMUNICATING FROM AN INTEGRATION PLATFORM TO A PROVISIONING SERVER

(75) Inventor: Prakash A. Trivedi, Centreville, VA (US)

(73) Assignee: MCI, Inc., Ashburn, VA (US)

( * ) Notice: Subject to any disclaimer, the term of this patent is extended or adjusted under 35 U.S.C. 154(b) by 596 days.

(21) Appl. No.: 10/097,862

(22) Filed: Mar. 15, 2002

(65) Prior Publication Data

US 2004/0073566 A1 Apr. 15, 2004

Related U.S. Application Data

(60) Provisional application No. 60/276,923, filed on Mar. 20, 2001, provisional application No. 60/276,953, filed on Mar. 20, 2001, provisional application No. 60/276,955, filed on Mar. 20, 2001, provisional application No. 60/276,954, filed on Mar. 20, 2001.

(51) Int. Cl.
*G06F 17/30* (2006.01)

(52) U.S. Cl. .................. 707/10; 707/1; 707/104.1; 709/225

(58) Field of Classification Search .............. 707/10, 707/102, 103 R; 709/225, 226, 231; 715/764; 718/101
See application file for complete search history.

(56) References Cited

U.S. PATENT DOCUMENTS

| | | | |
|---|---|---|---|
| 5,608,720 A | 3/1997 | Biegel et al. | |
| 5,758,343 A | 5/1998 | Vigil et al. | |
| 5,852,812 A | 12/1998 | Reeder | |
| 5,877,759 A | 3/1999 | Bauer | |
| 5,918,213 A | 6/1999 | Bernard et al. | |
| 5,999,612 A | 12/1999 | Dunn et al. | |
| 6,008,805 A | 12/1999 | Land et al. | |
| 6,115,741 A | 9/2000 | Domenikos et al. | |
| 6,125,391 A | 9/2000 | Meltzer et al. | |
| 6,145,001 A | 11/2000 | Scholl et al. | |
| 6,154,743 A | 11/2000 | Leung et al. | |
| 6,175,565 B1 | 1/2001 | McKinnon et al. | |
| 6,189,033 B1 | 2/2001 | Jin et al. | |
| 6,192,405 B1 | 2/2001 | Bunnell | |
| 6,192,418 B1 | 2/2001 | Hale et al. | |
| 6,195,697 B1 | 2/2001 | Bowman-Amuah | |
| 6,208,986 B1 | 3/2001 | Schneck et al. | |

(Continued)

FOREIGN PATENT DOCUMENTS

WO 97/22209 6/1997

(Continued)

OTHER PUBLICATIONS

"Netscape ECXpert Data Sheet", Netscape.com, copyright 2000, pp. 1-5.

(Continued)

*Primary Examiner*—Jeffrey Gaffin
*Assistant Examiner*—Hassan Mahmoudi

(57) ABSTRACT

A method for communicating from an integration platform to a server that executes object request broker (ORB) software includes receiving user-entered information at the integration platform. The integration platform generates an event based on the user-entered information and publishes the event on a channel subscribed to by a connector associated with the server. The connector receives the event information, transforms the event information to a format compatible with the server and establishes communications with the server. The connector downloads the information to the server and the server updates its database. The connector may also determine whether at least one other system received the event information before downloading the data to the server.

25 Claims, 13 Drawing Sheets

U.S. PATENT DOCUMENTS

| | | |
|---|---|---|
| 6,282,281 B1 | 8/2001 | Low |
| 6,330,560 B1 | 12/2001 | Harrison et al. |
| 6,334,116 B1 | 12/2001 | Ganesan et al. |
| 6,363,411 B1 * | 3/2002 | Dugan et al. ............... 709/202 |
| 6,418,324 B1 | 7/2002 | Doviak et al. |
| 6,535,855 B1 | 3/2003 | Cahill et al. |
| 6,697,806 B1 | 2/2004 | Cook |
| 6,741,980 B1 | 5/2004 | Langseth et al. |
| 2001/0032076 A1 | 10/2001 | Kursh |
| 2001/0037379 A1 | 11/2001 | Livnat |
| 2001/0037469 A1 | 11/2001 | Gupta et al. |
| 2001/0049745 A1 | 12/2001 | Schoeffler |
| 2002/0023232 A1 | 2/2002 | Serani et al. |
| 2002/0069166 A1 | 6/2002 | Moreau et al. |
| 2002/0123972 A1 | 9/2002 | Hodgson et al. |
| 2003/0058277 A1 * | 3/2003 | Bowman-Amuah ......... 715/765 |
| 2003/0172145 A1 | 9/2003 | Nguyen |
| 2004/0135805 A1 | 7/2004 | Gottsacker et al. |

FOREIGN PATENT DOCUMENTS

| | | |
|---|---|---|
| WO | 98/53582 | 11/1998 |

OTHER PUBLICATIONS

Putman, Janis, "Distribution Transparencies for Integrated System", MITRE Corp., Feb. 2000, pp. 1-18.

W. Yeong et al., "Lightweight Directory Access Protocol", RFC 1777, Mar. 1995, pp. 1-16.

"Businessware Overview", www.vitria.com., pp. 1-2, print date Mar. 14, 2002.

"Infranet", www.portal.com/products/infranet/infranet.html, pp. 1-4, print date Mar. 14, 2002.

Microsoft Press Computer Dicitonary, 1997, Microsoft Press, Third Edition, p. 238.

Costales, Bryan, "Sendmail", 1997, O'Reilly & Associates, Second Edition, p. 40-41.

Sadoski, Darleen, "Database Two Phase Commit", 1997 Software Engineering Institute, Carnegie Mellon Univerisity, downloaded Apr. 25, 2005. http://web.archive.org/web/20000229150540/http://www.sei.cmu.edu/str/descriptions/dtpc_body.html.

* cited by examiner

SYSTEMS AND METHODS FOR COMMUNICATING FROM AN INTEGRATION PLATFORM TO A PROVISIONING SERVER

RELATED APPLICATIONS

This application claims priority under 35 U.S.C. § 119(e) based on the following U.S. Provisional Applications: Ser. Nos. 60/276,923, 60/276,953, 60/276,955, and 60/276,954 all filed on Mar. 20, 2001, the disclosures of which are incorporated herein by reference.

FIELD OF THE INVENTION

The present invention relates generally to support systems for telecommunications service providers and, more particularly, to providing a connector from an integration platform to a provisioning server.

BACKGROUND OF THE INVENTION

Telecommunications service providers continually increase the number of services and products they offer to customers. As competition increases, service providers must provide an increased level of support for these services while keeping costs down.

In conventional support systems, a service provider may use a system integrator to develop solutions that tie together multi-vendor hardware systems. The system integrator typically uses a commercial off the shelf (COTS) software package to integrate the various hardware systems.

One problem with using COTS software to integrate multi-vendor hardware systems is that the selected software is often incompatible with all of the existing hardware systems. In this case, the service provider is often forced to replace legacy systems (i.e., existing systems) in order to maintain full functionality.

Another problem with using COTS software to integrate multi-vendor hardware systems is that the selected software package often does not include pre-packaged modules that permit the software to communicate with various hardware platforms. This may cause the system integrator to exclude one or more hardware platforms from the support system.

SUMMARY OF THE INVENTION

There exists a need for systems and methods that improve problems associated with providing a system to support various services and products that a telecommunication service provider offers.

These and other needs are met by the present invention where an operational support system (OSS) integrates various hardware and software platforms. The OSS includes a middleware core that may be customized to integrate various applications/platforms and to ensure that data from one application can be routed to the appropriate destination(s).

According to one aspect of the invention, a method for communicating from a first system to a first server executing an object request broker (ORB) that is common object request broker architecture (CORBA) compliant is provided. The method includes receiving user-entered information at the first system and sending event information to a channel, where the event information is based on the user-entered information and the channel is subscribed to by an ORB connector. The method also includes receiving, by the ORB connector, the event information, transforming the event information to a format compatible with the first server and establishing, by the ORB connector, communications with the first server, where the first server controls access to a first database. The method further includes downloading the transformed event information to the first server, preparing to write the transformed event information to the first database and determining whether a message from a database system has been received. The method also includes signaling the first server to write the transformed event information to the first database when the message from the database system has been received.

Another aspect of the present invention provides a computer-readable medium having stored instructions which when executed by a processor, cause the processor to monitor an input channel for data associated with at least one of adding, deleting and modifying information stored in a server, the server executing an ORB that complies with CORBA. The instructions also cause the processor to receive the data associated with at least one of adding, deleting and modifying information stored in the server, forward the data to a data storage system and receive an indication that the data storage system stored the data. The instructions further cause the processor to establish communications with the server in response to receiving the indication, format the data based on a type associated with the received data and download the formatted data to the server.

A further aspect of the present invention provides a software-based connector for interfacing between an integration platform and a server executing an ORB that is CORBA compliant. The connector includes a transformer module configured to receive input information associated with at least one of a request to change attributes associated with a service or add a new service and transform the data into an appropriate format based on the request. The connector also includes a client module configured to establish communications with the server and download the transformed data to the server.

Other features and advantages of the present invention will become readily apparent to those skilled in this art from the following detailed description. The embodiments shown and described provide illustration of the best mode contemplated for carrying out the invention. The invention is capable of modifications in various obvious respects, all without departing from the invention. Accordingly, the drawings are to be regarded as illustrative in nature, and not as restrictive.

BRIEF DESCRIPTION OF THE DRAWINGS

Reference is made to the attached drawings, wherein elements having the same reference number designation may represent like elements throughout.

DETAILED DESCRIPTION

The following detailed description of implementations consistent with the present invention refers to the accompanying drawings. The same reference numbers in different drawings may identify the same or similar elements. Also, the following detailed description does not limit the invention. Instead, the scope of the invention is defined by the appended claims and equivalents.

Systems and methods consistent with the present invention provide a connection from a support system to a redirect server using a flexible software based connector. The connector may also ensure that the data is properly routed to other portions of the support system before storing the data to the redirect server.

Exemplary System

Figure 1:
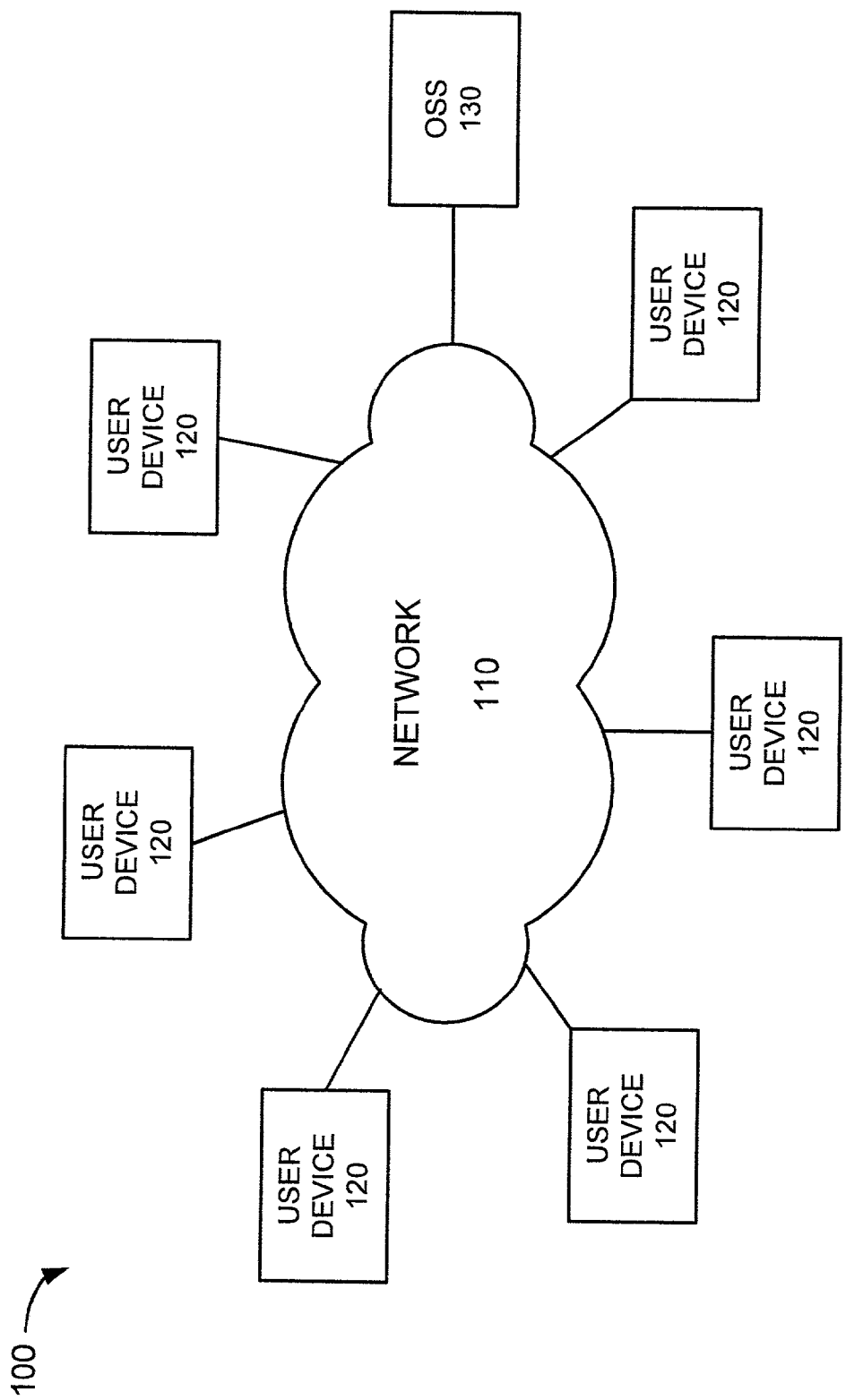
FIG. 1 is a block diagram of an exemplary system in which methods and systems consistent with the present invention may be implemented.

FIG. 1 illustrates an exemplary system 100 in which methods and systems consistent with the present invention may be implemented. In FIG. 1, system 100 includes a network 110 that interconnects a group of user devices 120 and an operational support system (OSS) 130. It will be appreciated that a typical system may include more or fewer devices than illustrated in FIG. 1. Moreover, system 100 may include additional devices (not shown) that aid in the transfer, processing, and/or reception of data.

The network 110 may include, for example, the Internet, an intranet, a local area network (LAN), a metropolitan area network (MAN), a wide area network (WAN), a public switched telephone network (PSTN), and/or some other similar type of network. In fact, the network 110 may include any type of network or combination of networks that permits routing of information from a particular source to a particular destination.

The user devices 120 may include a type of computer system, such as a mainframe, minicomputer, or personal computer, a type of telephone system, such as a POTS telephone or a session initiation protocol (SIP) telephone, and/or some other similar type of device that is capable of transmitting and receiving information to/from the network 110. The user device 120 may connect to the network via any conventional technique, such as a wired, wireless, or optical connection.

Figure 2:
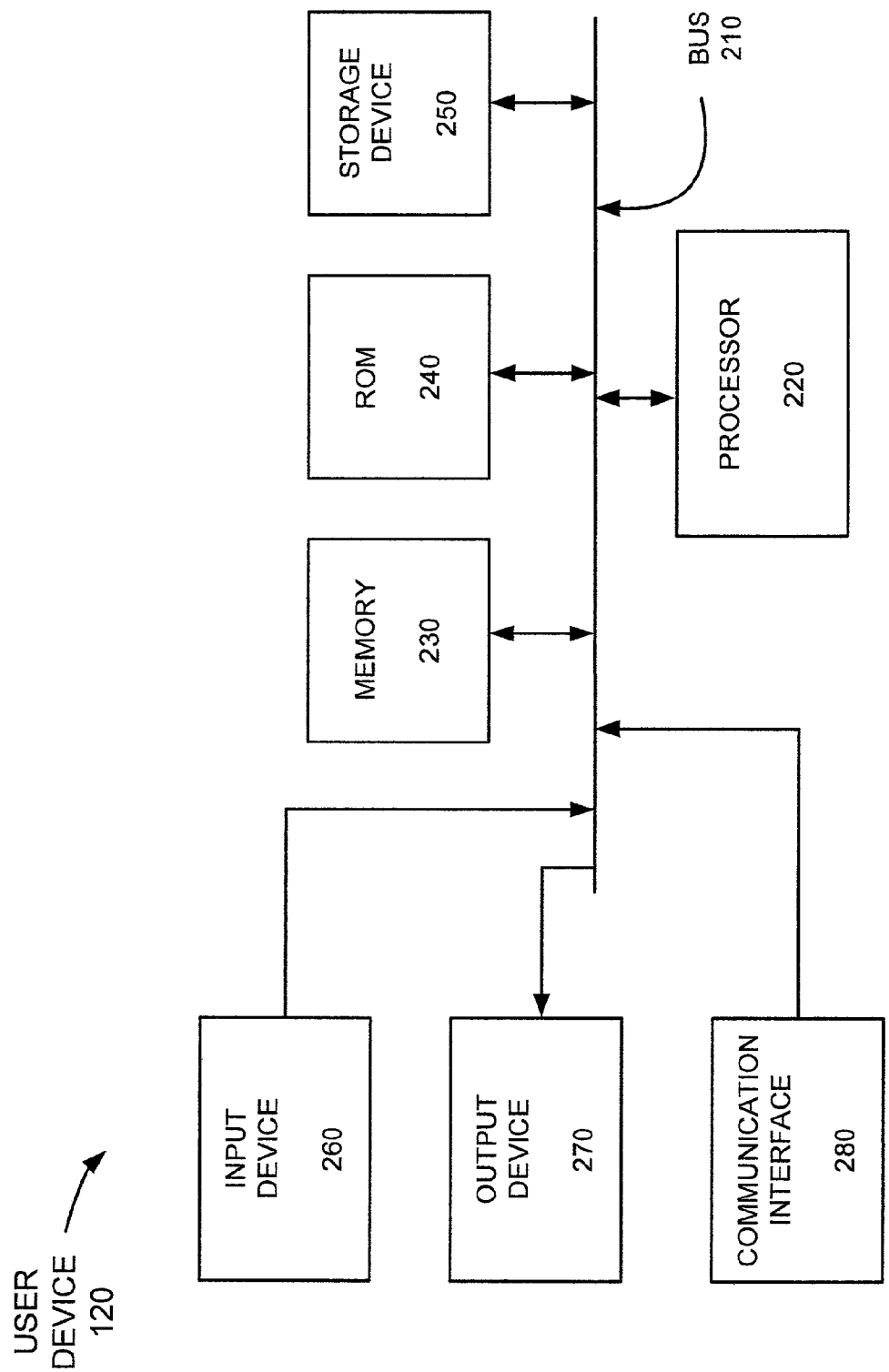
FIG. 2 illustrates an exemplary configuration of a user device of FIG. 1 in an implementation consistent with the present invention.

FIG. 2 illustrates an exemplary configuration of a user device 120 of FIG. 1 in an implementation consistent with the present invention. In FIG. 2, the user device 120 includes a bus 210, a processor 220, a memory 230, a read only memory (ROM) 240, a storage device 250, an input device 260, an output device 270, and a communication interface 280. The bus 210 may include one or more conventional buses that permit communication among the components of the user device 120.

The processor 220 may include any type of conventional processor or microprocessor that interprets and executes instructions. The memory 230 may include a random access memory (RAM) or another type of dynamic storage device that stores information and instructions for execution by the processor 220. The memory 230 may also be used to store temporary variables or other intermediate information during execution of instructions by processor 220.

The ROM 240 may include a conventional ROM device and/or another type of static storage device that stores static information and instructions for the processor 220. The storage device 250 may include a magnetic disk or optical disk and its corresponding drive and/or some other type of magnetic or optical recording medium and its corresponding drive for storing information and/or instructions.

The input device 260 may include any conventional mechanism that permits an operator to input information to the user device 120, such as a keyboard, a mouse, a microphone, a pen, a biometric input device, such as voice recognition device, etc. The output device 270 may include any conventional mechanism that outputs information to the operator, including a display, a printer, a speaker, etc.

The communication interface 280 may include any transceiver-like mechanism that enables the user device 120 to communicate with other devices and/or systems, such as OSS 130. For example, the communication interface 280 may include a modem or an Ethernet interface to a network. Alternatively, communication interface 280 may include other mechanisms for communicating via a data network.

Returning to FIG. 1, the OSS 130 provides the infrastructure for integrating applications supporting traditional telephony services and applications supporting non-traditional products/services. Through OSS 130, customers, using, for example, user device 120, may manage, configure, and provision services in real time, obtain real-time billing information, and generate reports using a rules-centric middleware core. In one embodiment, a customer may perform these functions through a single point of entry using an Internet accessible web interface.

Figure 3:
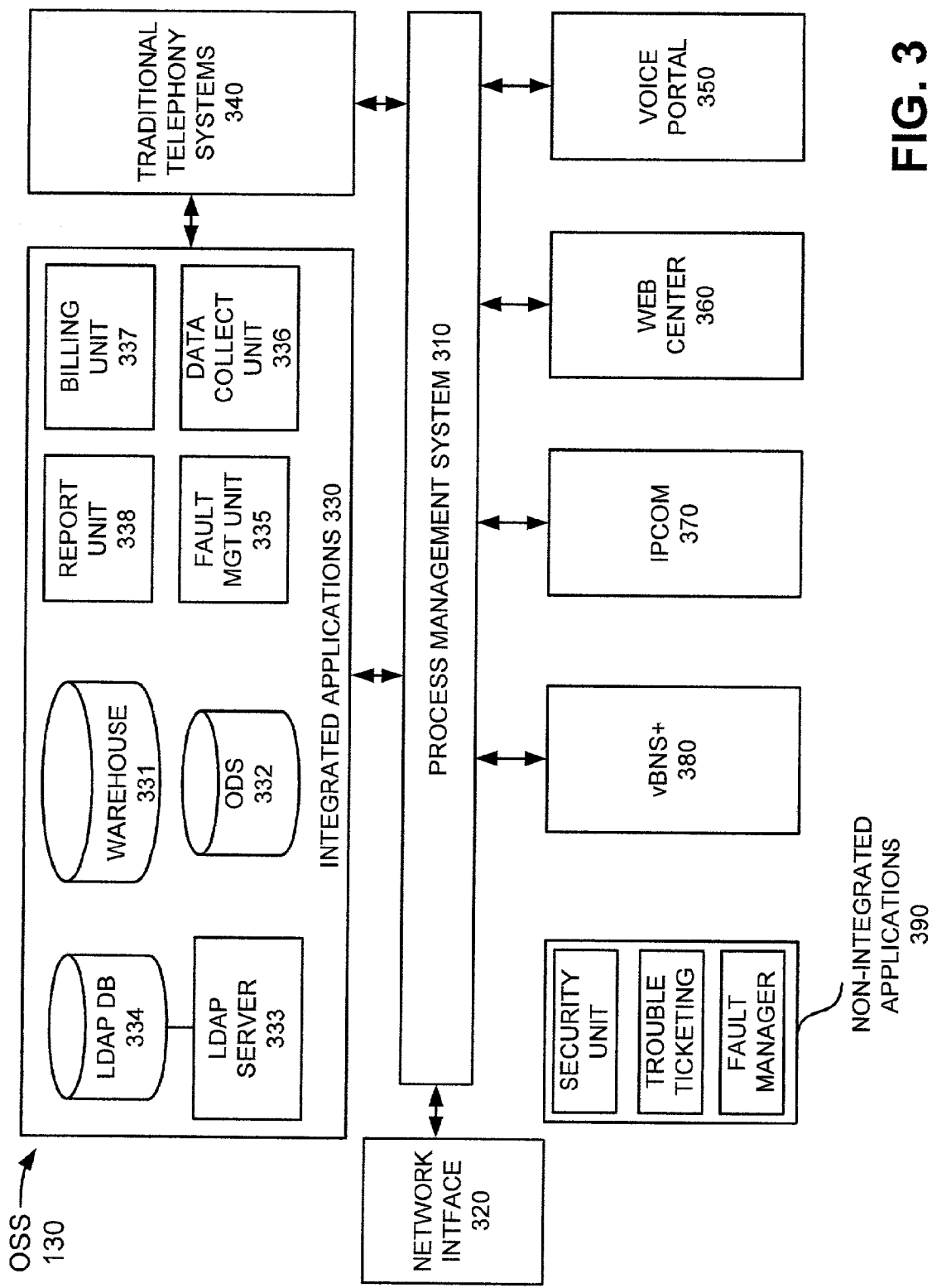
FIG. 3 illustrates an exemplary configuration of the operational support system (OSS) of FIG. 1 in an implementation consistent with the present invention.

FIG. 3 illustrates an exemplary configuration of the OSS 130 of FIG. 1 in an implementation consistent with the present invention. As illustrated, the OSS 130 includes a process management system 310, a network interface 320, a group of integrated applications 330, a group of traditional telephony systems 340, a voice portal unit 350, a web center unit 360, an Internet Protocol communications (IPCOM) unit 370, a very high performance backbone network service (vBNS+) unit 380, and a group of non-integrated applications 390. It will be appreciated that the OSS 130 may include other components (not shown) that aid in receiving, processing, and/or transmitting data.

The process management system 310 acts as the backbone to the OSS 130 by providing graphical process automation, data transformation, event management, and flexible connectors for interfacing with OSS 130 components. In one implementation consistent with the present invention, the process management system 310 uses a Common Object Request Broker Architecture (CORBA) based publish-and-subscribe messaging middleware to integrate the different components of the OSS 130. The process management system 310 may, for example, be implemented using Vitria Technology Inc.'s BusinessWare software system. Other techniques for integrating the different components of the OSS 130 may also be used, such as extensible markup language (XML) or Enterprise JavaBeans (EJB).

The network interface 320, also referred to as the web front end, provides a graphical user interface that allows users (e.g., customers, engineers, account teams, and the like) to access the components of the OSS 130. The network interface 320 may include commercial off the shelf (COTS) software or hardware packages, such as Siteminder by Netegrity Inc. and/or iplanet by Sun Microsystems Inc., custom software or hardware or a combination of custom software/hardware and COTS software/hardware.

The network interface 320 may, for example, allow customers to request a new service or terminate an existing service and monitor or change network or user settings/preferences. The network interface 320 may also allow customers to obtain reports and billing information, perform account management and perform trouble reporting and tracking, all in a real time manner. The network interface 320 may also allow engineers to submit transactions to control and configure network elements and services in a real time manner. The network interface 320 may also allow account teams to create and cancel accounts, generate sub-accounts from master accounts, access current account data, and access historical account data.

The network interface 320 authenticates users and controls actions that authenticated users are allowed to execute in the OSS 130. In one implementation consistent with the present invention, the network interface 320 allows users access to the components of the OSS 130 via a single sign-on technique. This single sign-on eliminates the need for users to sign in (or authenticate themselves) in order to access different components of the OSS 130.

The integrated applications 330 may include, for example, a data warehouse 331, an operational data store (ODS) 332, a lightweight directory access protocol (LDAP) based server 333, an LDAP database 334, a fault management unit 335, a data collection unit 336, a billing unit 337 and a reporting unit 338. The data warehouse 331 may include one or more separate databases for storing data. The data warehouse 331 acts as a repository for service order, account, usage and performance data. In one implementation, the data warehouse 331 may be implemented as a relational database management system (RDBMS) and may include a server (not shown) that controls access to the data warehouse 331.

The ODS 332 may also include one or more separate databases for storing data. The ODS 332 temporarily stores data that is used in the course of fulfilling, for example, account creation, service order management, and network provisioning operations. The ODS 332 also stores authentication and authorization data. This data defines user's roles and privileges. Like the data warehouse 331, the ODS 332 may be a RDBMS and may include a server (not shown) that controls access to the ODS 332.

The LDAP server 333 may be a general directory server that controls access to the LDAP database 334. The LDAP database 334 may be an LDAP-based repository that stores information associated with users in a hierarchical, tree-like structure. For example, the LDAP database 334 may store attributes for a user that may include preferences associated with the following exemplary services: call blocking, follow-me, call forwarding, voice mail, conference calling, single line extension, call screening, quality of service, class of service, dial plan restrictions, dynamic registration, secondary directory number and call transfer. The LDAP database 334 may store this information as one or more directory entries for each user. Each directory entry may include an identifier associated with the user and a collection of attributes associated with the user. Each of the attributes may include a type and one or more values that identify the user's settings associated with that type. In this manner, the LDAP server 333 and LDAB database 334 provide a system that enables the user's preferences regarding various services to be stored, searched, updated and retrieved in an efficient manner. The LDAP server 333 and LDAP database 334 are shown as separate devices. It should be understood, however, that these two devices may both be part of the same directory server in implementations consistent with the present invention.

The fault management unit 335 monitors and manages the operation of the OSS 130. The fault management unit 335 may receive information from every device, computer and application in the OSS 130 via the process management system 310. In situations where a fault has been detected, the fault management unit 335 may transmit a trouble ticket identifying the fault to the appropriate system administrator.

The data collection unit 336 collects usage and performance data for the products supported by the OSS 130. In one implementation, the data collection unit 336 utilizes a hierarchical architecture, having a centralized manager that defines and manages collection and data transformation. Individual, lower level gatherers interface with source targets. The data collection unit 336 may aggregate the gathered data and provide the data to other end-user applications in a desired format. For example, data collection unit 336 may provide various records to billing unit 337.

The billing unit 337 receives customer usage and performance data from the data collection unit 336 and generates bills for the customer. The billing unit 337 may be configured with a variety of rating rules and plans and may provide mechanisms to manage and create rating plans. The rating rules may include traditional telephony styled rating rules that include time-of-day, day-of-week, distance-based, flat rate, non-recurring and recurring on a definably regular basis, such as weekly, bi-weekly, monthly, etc. In an exemplary implementation of the present invention, the billing unit 337 may provide bonus points, airline miles and other incentives as part of the rules-based rating and billing service.

The billing unit 337 may provide revenue and billing reports to authorized parties. The billing unit 337 may further allow customers to access previous invoices and view current charges not yet billed. In an exemplary implementation consistent with the present invention, the billing unit 337 may transfer rated events and summary records into other billing and revenue systems. For example, billing unit 337 may receive and transfer billing information or event information to a legacy billing system (i.e., an existing billing system) that generates the actual bill. In alternative implementations, billing unit 337 may provide hard copy bills and/or provide electronic bills to a customer. In this implementation, billing unit 337 may also be configured to perform electronic payment handling.

As customer orders and accounts are created or modified through normal business functions, the OSS 130 keeps the billing unit 337 up to date in a real-time manner. Authorized parties may also extract real-time data from the billing unit 337.

The reporting unit 338 may interact with various components of the OSS 130, such as the data warehouse 331, the data collection unit 336 and the billing unit 337, to provide user (i.e., customers, engineers and account team members) with the ability to obtain reports based on real-time data. The reports may include, for example, billing reports, reports regarding the usage and/or performance of the network, etc.

The traditional telephony systems 340 may include one or more components that are typically used in a telecommunications network. In one implementation, the traditional telephony systems 340 include one or more legacy systems, such as an order entry system, provisioning system, billing system, and the like.

The voice portal unit 350 provides a variety of information services to subscribers. These services may include, for example, banking, brokerage, and financial services, travel and entertainment services, distribution and shipping services, insurance services, health and pharmaceutical services, manufacturing services, and the like. The voice portal unit 350 may store subscriber profiles to determine a subscriber's device preference (e.g., a cellular telephone, a personal digital assistant, a paging device, and the like) and may also track a subscriber's access to the services provided for billing purposes.

The web center 360 acts as a virtual call center by queuing, routing and distributing communications from any first location to an appropriate agent at any second location. The web center 360 allows agents to handle multiple mediums (e.g., inbound telephone calls, faxes, e-mails, voice-mail, VoIP transactions, etc.) via a single browser-based interface. In one implementation, the web center 360 may be implemented using CallCenter@nywhere from Telephony@Work, Inc.

The IPCOM unit 370 may include one or more devices that provide voice-over-IP (VoIP) services to subscribers. The subscribers may make and receive calls via an IP communications network using, for example, session initiation protocol (SIP) telephones. The IPCOM unit 370 may support the following services: follow me, call blocking, call forwarding, voice mail, conference calling, single line extension, call screening, quality of service, class of service, dial-plan restrictions, dynamic registration, secondary directory number, and call transfer. Customers may set or change attributes associated with these features via the network interface 320.

The vBNS+ unit 380 provides the IP infrastructure for the IP communications network. The vBNS+ unit 380 may include a group of edge routers for routing packets in the network. The non-integrated applications 390 may include, for example, a security unit, a trouble ticketing unit, and a fault manager. The security unit may include one or more firewalls for securing the network interface 320, telephone equipment (e.g., PBX, switch, redirect server, etc.) and network equipment. The trouble ticketing unit manages the issuance and resolution of trouble tickets and the fault manager monitors the hardware components of the OSS 130.

Figure 4:
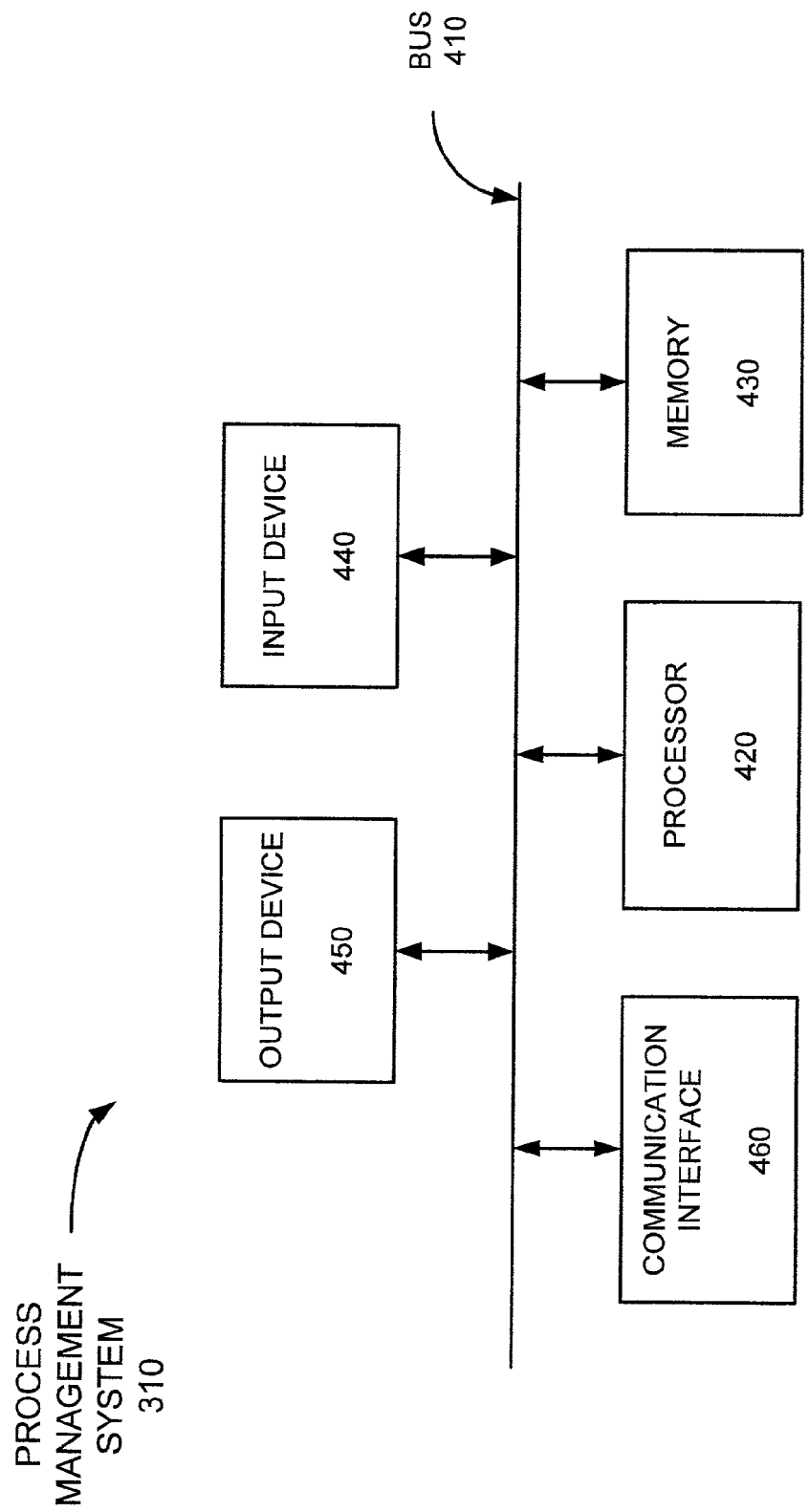
FIG. 4 illustrates an exemplary configuration of the process management system of FIG. 3 in an implementation consistent with the present invention.

FIG. 4 illustrates an exemplary configuration of the process management system 310 of FIG. 3 in an implementation consistent with the present invention. As illustrated, the process management system 310 includes a bus 410, a processor 420, a memory 430, an input device 440, an output device 450, and a communication interface 460. The bus 410 permits communication among the components of the process management system 310.

The processor 420 may include any type of conventional processor or microprocessor that interprets and executes instructions. The memory 430 may include a RAM or another type of dynamic storage device that stores information and instructions for execution by the processor 420; a ROM or another type of static storage device that stores static information and instructions for use by the processor 420; and/or some type of magnetic or optical recording medium and its corresponding drive.

The input device 440 may include any conventional mechanism that permits an operator to input information to the process management system 310, such as a keyboard, a mouse, a pen, voice recognition and/or biometric mechanisms, and the like. The output device 450 may include any conventional mechanism that outputs information to the operator, including a display, a printer, a speaker, etc. The communication interface 460 may include any transceiver-like mechanism that enables the process management system 310 to communicate with other devices and/or systems, such as the network interface 320, integrated applications 330, traditional telephony systems 340, etc. via a wired, wireless, or optical connection.

As discussed previously, process management system 310 may run a CORBA-based program to integrate various components of the OSS 130. As such, execution of the sequences of instructions associated with the program contained in a computer-readable medium, such as memory 430, causes processor 420 to implement the functional operations described below. In alternative embodiments, hardwired circuitry may be used in place of or in combination with software instructions to implement the present invention. Thus, the present invention is not limited to any specific combination of hardware circuitry and software.

Figure 5:
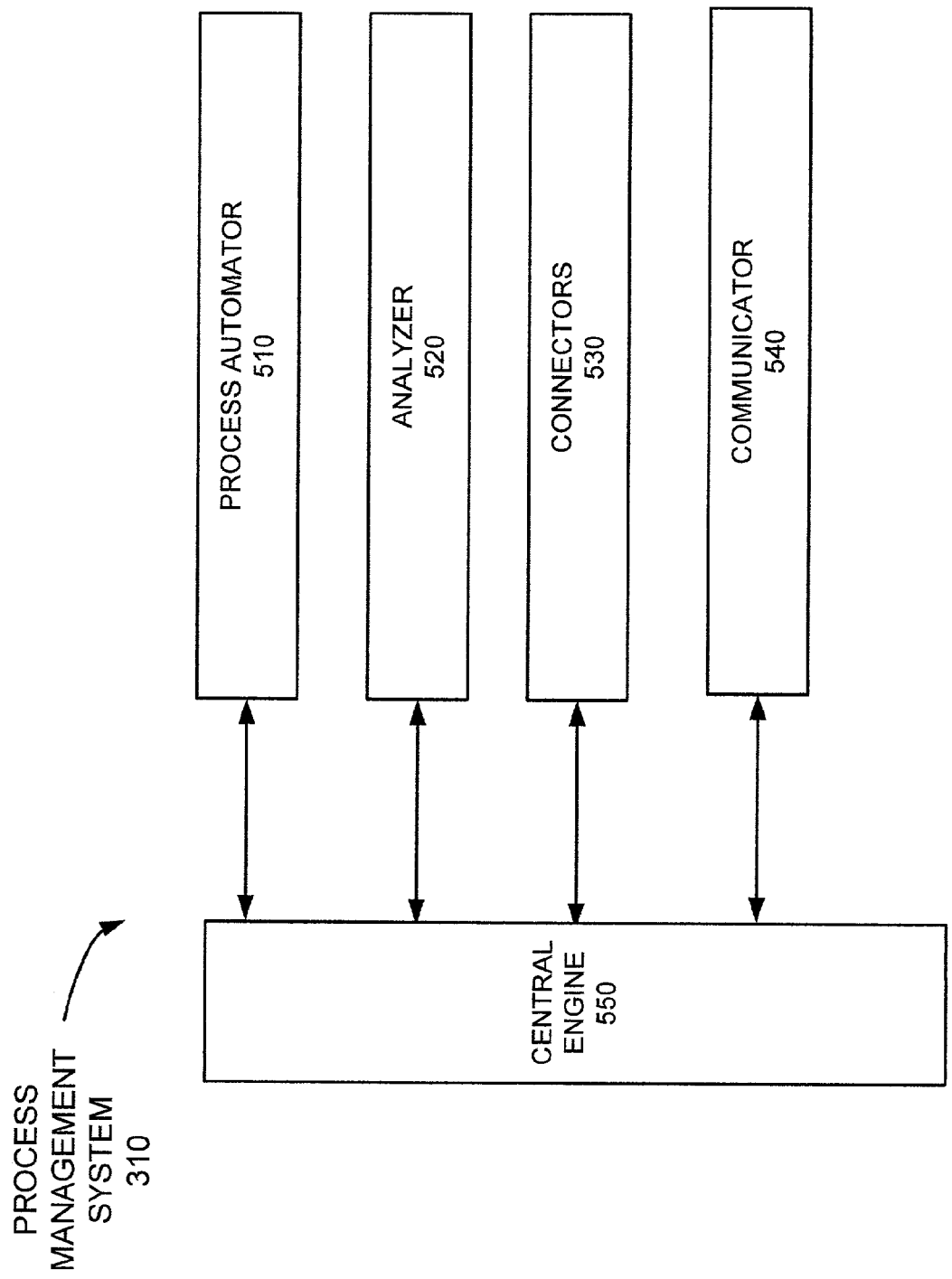
FIG. 5 illustrates an exemplary functional block diagram of the process management system of FIG. 3 in an implementation consistent with the present invention.

FIG. 5 illustrates an exemplary functional block diagram of the process management system 310 of FIG. 3 in an implementation consistent with the present invention. As illustrated, the process management system 310 includes a process automator 510, an analyzer 520, a group of connectors 530, a communicator 540 and a central engine 550. In an exemplary implementation of the present invention, these elements are implemented as functional modules of a software program executed by processor 420 of the process management system 310. It will be appreciated that the process management system 310 may execute additional functional modules (not shown) that aid in the reception, processing, and/or transmission of data.

The processor automator 510 includes a modeling tool that allows event processing to be visually modeled by engineers and product development analysts. The process automator 510 can then execute these models to create an automated business process executed by the central engine 550. The analyzer 520 provides on-going and real-time monitoring of the components of the OSS 130. The analyzer 520 delivers reports, history, and trending on events processed through the central engine 550. The connectors 530 allow the components of the OSS 130 to interact and communicate with the process management system 310. The OSS components may communicate with the process management system 310 via standard messaging or through full publish/subscribe processing. The communicator 540 enables the process management system 310 to communicate with various components of the OSS 130 using transmission control protocol/Internet protocol (TCP/IP). The central engine 550 is the core of the software program and executes customized rules to enable the process management system 310 to integrate the various systems of the OSS 130, as described in more detail below. It should be understood that the central engine 550 may be programmed to perform any rules-based processing based on the particular requirements associated with managing the OSS 130.

Figure 6:
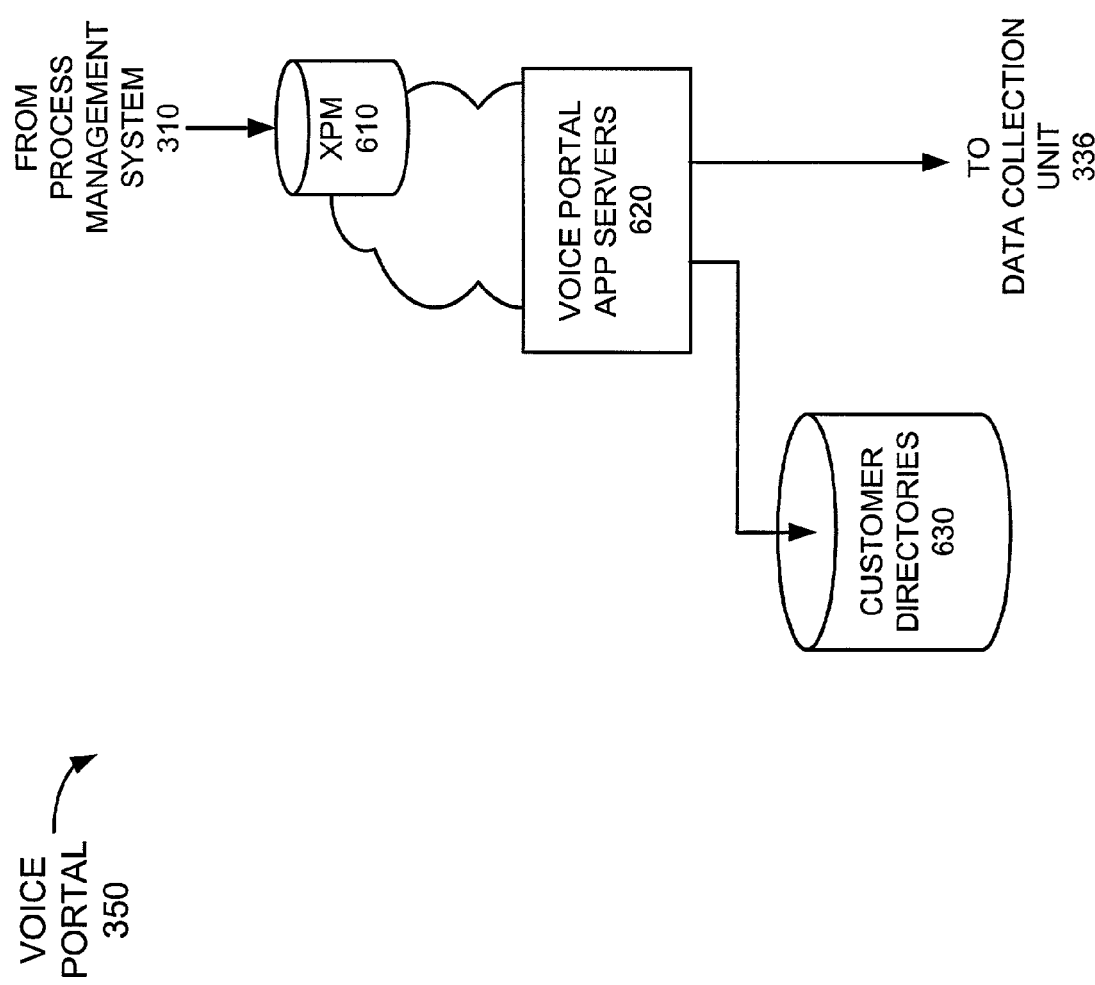
FIG. 6 illustrates an exemplary configuration of the voice portal of FIG. 3 in an implementation consistent with the present invention.

FIG. 6 illustrates an exemplary configuration of the voice portal unit 350 of FIG. 3 in an implementation consistent with the present invention. As illustrated, the voice portal unit 350 includes an eXtensible Program Management (XPM) unit 610, one or more voice portal application servers 620, and a customer directory database 630. The XPM unit 610 receives user profile information from the network interface 320 via the process management system 310 and stores this information for use by the voice portal application servers 620. The XPM unit 610 may also receive other information, such as information identifying the device(s) (e.g., personal digital assistant, cellular telephone, pager, etc.) by which a user wishes to receive the information associated with a particular service(s) to which the user has subscribed.

The voice portal application servers 620 may include one or more servers that interact with the XPM unit 610 to provide, for example, banking, brokerage, and financial services, travel and entertainment services, distribution and shipping services, insurance services, health and pharmaceutical services, manufacturing services, and the like. Voice portal application servers 620 may also provide data collection unit 336 with information regarding what services are accessed and by whom. The data collection unit 336 may then pass this information to billing unit 337 for billing purposes. The voice portal application servers 620 may be located at the OSS 130 or distributed throughout the network 110. The customer directories 630 may store information relating to the services provided by the voice portal application servers 620. For example, the customer directories 630 may store stock quotes, current weather forecasts, real-time sports scores, etc.

Figure 7:
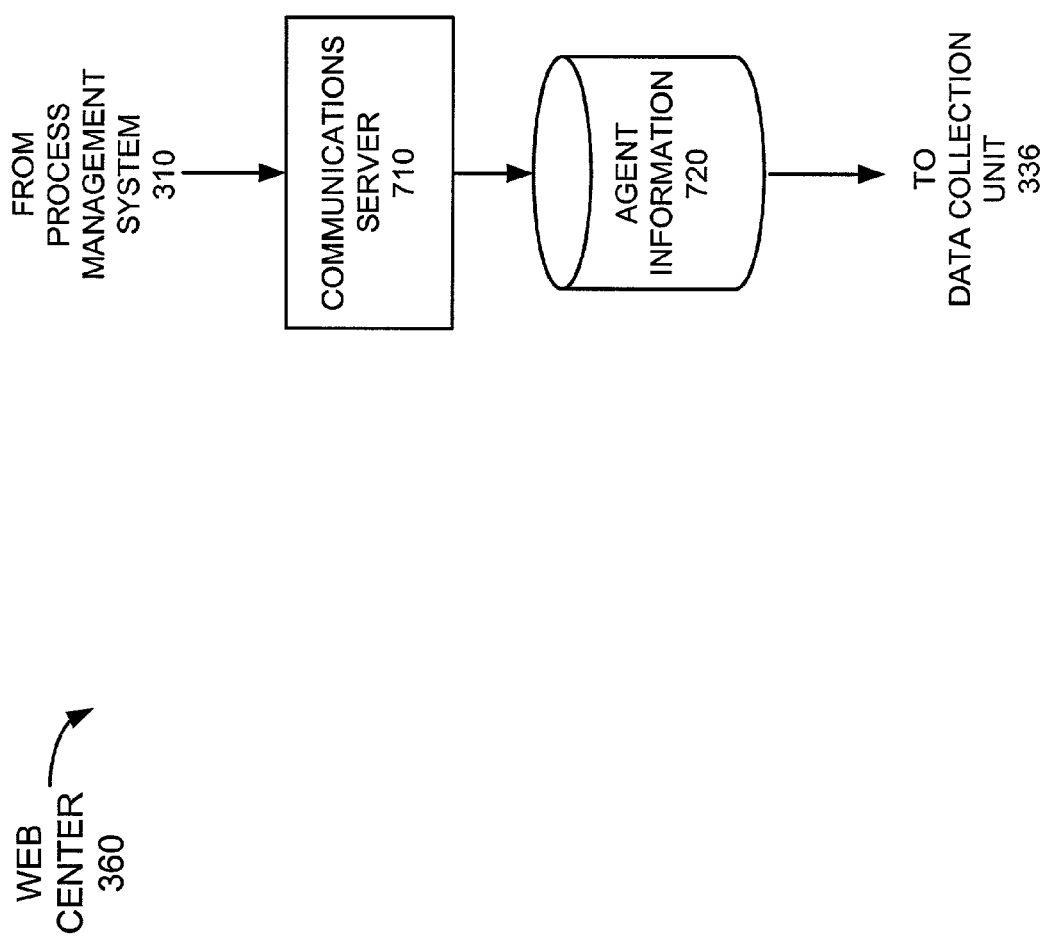
FIG. 7 illustrates an exemplary configuration of the web center of FIG. 3 in an implementation consistent with the present invention.

FIG. 7 illustrates an exemplary configuration of the web center 360 of FIG. 3 in an implementation consistent with the present invention. As illustrated, the web center 360 includes a communications server 710 and an agent information database 720. The communication server 710 queues, routes, and distributes communications from any first location to an appropriate agent at any second location. The communications server 710 may determine the appropriate agent based on data stored in the agent information database 720. The agent information database 720 may store agent activity information, the particular skills of the agents, and the like. Once a customer has utilized the services of the web center 360, the usage information may be transmitted to the data collection unit 336 and then to the billing unit 337 for billing. Users may, via the network interface 320, provision new services, such as order a toll free number.

Figure 8:
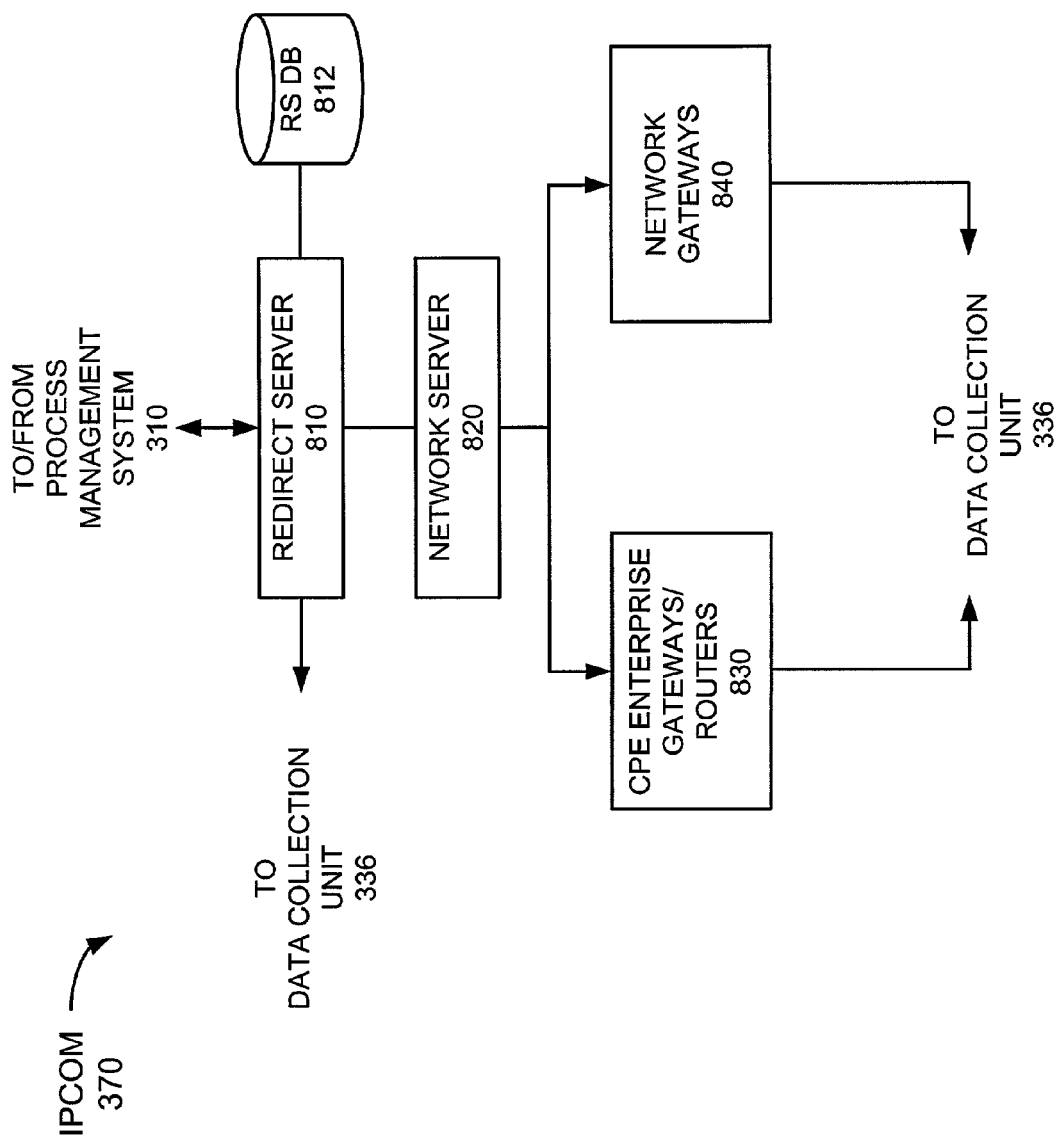
FIG. 8 illustrates an exemplary configuration of the Internet Protocol communications (IPCOM) unit of FIG. 3 in an implementation consistent with the present invention.

FIG. 8 illustrates an exemplary configuration of the IPCOM unit 370 of FIG. 3 in an implementation consistent with the present invention. As illustrated, the IPCOM unit 370 includes a redirect server 810, a redirect server database 812, network server 820, customer provided equipment (CPE) enterprise gateways/routers 830 and network gateways 840. According to an exemplary implementation, the redirect server 810 executes an object request broker (ORB) that is CORBA compliant. The redirect server 810 stores data in database 812 relating to call processing (e.g., information identifying the device by which the subscriber wishes to receive the call, network configuration information, etc.), subscriber profiles (e.g., a subscriber identifier) and network-supported features. The redirect server 810 may decide how to route calls based on information stored in redirect server database 812. The redirect server 810 and the redirect server database 812 are shown as separate devices. It should be understood that these devices may both be part of the same server in implementations consistent with the present invention.

The redirect server 810 forwards the routing information to the network server 820. The network server 820, also referred to as the proxy server or SIP server, processes the actual calls made over the IP communications network. The network server 820 directs the calls to CPE enterprise gateways/routers 830 or network gateways 840 based on the type of call and the network-supported features to which a customer subscribes. The network-supported features may include, for example, follow me, call blocking, call forwarding, voice mail, conference calling, single line extension, call screening, quality of service, class of service, dial-plan restrictions, dynamic registration, secondary directory number, and call transfer. As described above, a subscriber may change attributes of these network-supported features using the network interface 320. The redirect server 810 may also communicate with the data collection unit 336.

The CPE enterprise gateways/routers 830 may include one or more gateways for linking POTS telephone systems to the IP communications network. The CPE enterprise gateways/routers 830 may, for example, connect to a customer's private branch exchange (PBX) and convert TDM voice data into VoIP packets and voice signaling into SIP messages. The CPE enterprise gateways/routers 830 may also include one or more routers that receive information from a SIP phone over a network, such as a LAN or WAN.

The network gateways 840 may include one or more gateways for linking the IP communications network to the PSTN in a well known manner. The CPE enterprise gateways/routers 830 and network gateways 840 track customer access and transmit this customer access data to the data collection unit 336 for billing purposes.

Figure 9:
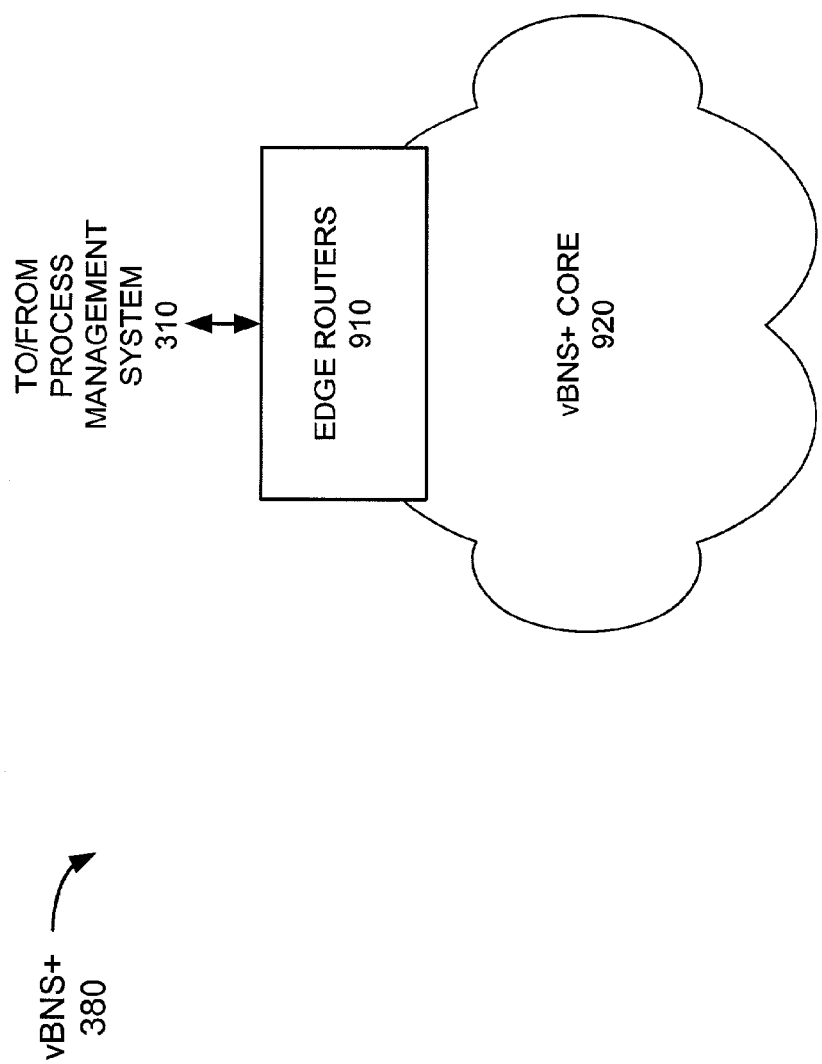
FIG. 9 illustrates an exemplary configuration of the very high performance backbone network service (vBNS+) unit of FIG. 3 in an implementation consistent with the present invention.

FIG. 9 illustrates an exemplary configuration of the vBNS+ unit 380 of FIG. 3 in an implementation consistent with the present invention. As illustrated, the vBNS+ unit 380 includes a group of edge routers 910 that route packets to/from the vBNS+ core network 920. The edge routers 910 may connect to the network server 820, redirect server 810, network gateways 830, customer's CPE equipment, other routers in the IP communications network, directly to SIP telephones, etc. The vBNS+ core 920 may include one or more core routers for routing packets between edge routers.

The foregoing description of the OSS 130 provides an overview of the operations of the OSS 130. A more detailed description of the present invention as embodied, for example, in the process management system 310, is provided below.

Redirect Server Connector

As described previously, the OSS 130 may provide a number of products and services to users, such as VoIP services. Many of these services require access to the redirect server 810 in near real time. The present invention is directed to systems and methods for enabling the process management system 310 to communicate with the redirect server 810 to support various products/services.

Figure 10:
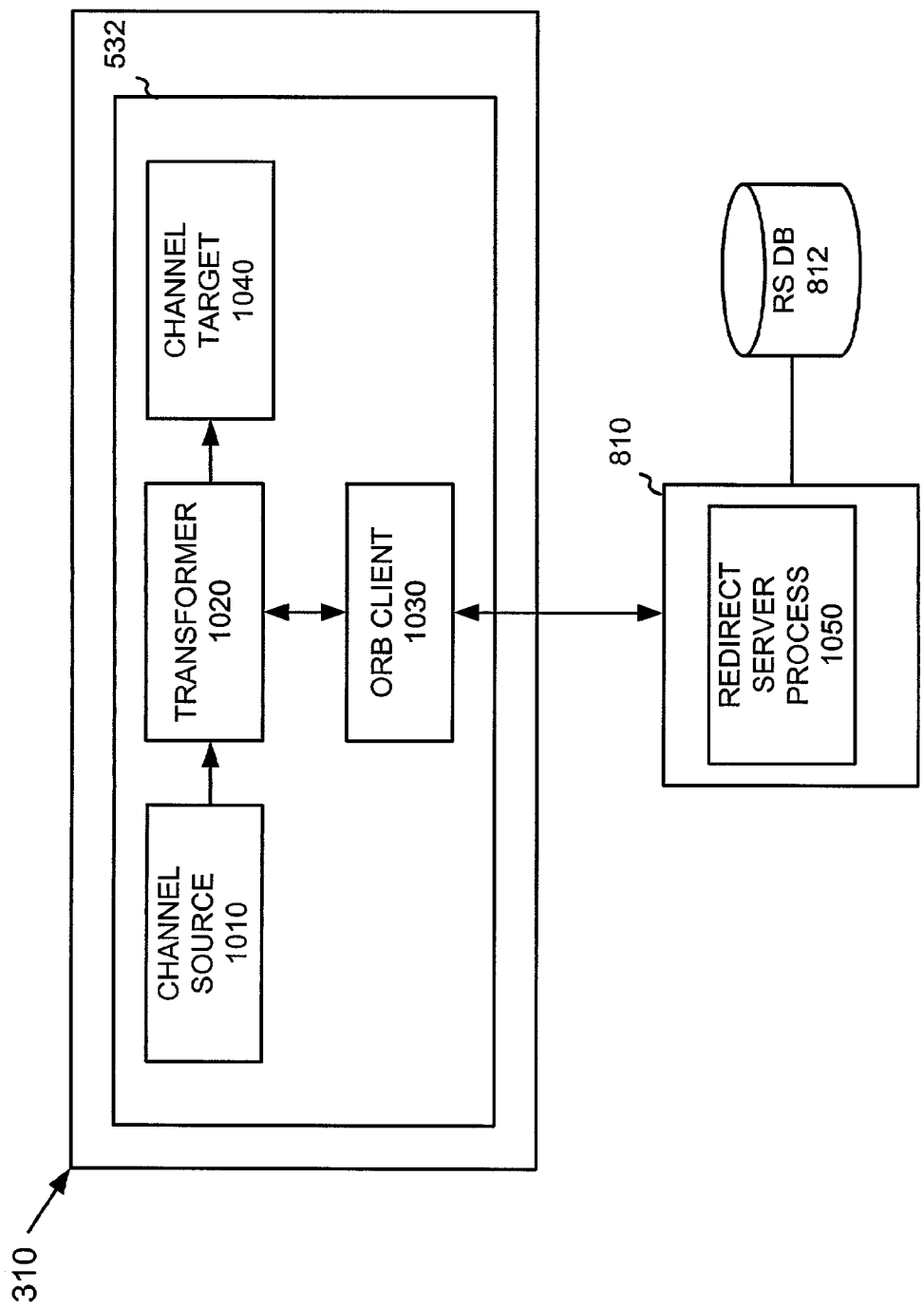
FIG. 10 illustrates an exemplary functional block diagram associated with one of the connectors of FIG. 5 in an implementation consistent with the present invention.

FIG. 10 is an exemplary functional block diagram illustrating one of the connectors 530 (FIG. 5) of the process management system 310 that enables the process management system 310 to communicate with the redirect server 810. Referring to FIG. 10, connector 532, also referred to as the object resource broker (ORB) connector 532, may be a software module (i.e., part of the software program) executed by process management system 310. The ORB connector 532 may be CORBA compliant and enables the process management system 310 to communicate with a server, such as redirect server 810 that executes a CORBA compliant ORB. The ORB connector 532 may include a channel source 1010, a transformer 1020, an ORB client 1030 and a channel target 1040. These elements may represent functional processes implemented in software.

The ORB connector 532 acts as a conversion point to drive data to and from the redirect server 810, since the redirect server 810 is not capable of performing a publish/subscribe activity on its own without the ORB connector 532. The ORB connector 532 manages the semantics associated with managing event queues on a channel on behalf of the redirect server 810. According to an exemplary implementation of the invention, the ORB connector 532 communicates with the redirect server 810 to enable a user to add, modify or delete information stored in the redirect server database 812.

For example, as described previously, the redirect server database 812 may store call processing information, subscriber profiles, network-supported features, etc. The redirect server 810 may also store information in the redirect server database 812 that is associated with SIP services to enable the OSS 130 to perform address validation, feature status checks and provide real-time subscriber feature configuration information. The subscriber features may include information associated with call blocking, follow-me, call forwarding, voice mail, conference calling, single line extension, call screening, quality of service, class of service, dial plan restrictions, dynamic registration, secondary directory number and call transfer for the user. The redirect server 810 may also store information associated with how the IP communications network is configured. The redirect server 810 may store this information in redirect server database 812. When the user wishes to modify information, such as information associated with a subscriber feature or the user's profile, the user may input this information via network interface 320. The process management system 310 may receive the information from network interface 320 and may then implement the user's change via ORB connector 532, as described in more detail below.

The ORB connector 532 may also include logic that allows "event" information to be written to the redirect server database 812 using a 2-phase commit procedure. The event information may include the user-entered information received via the network interface 320. By using a 2-phase commit procedure, the process management system 310 ensures that data written to the redirect server database 812 is consistent with data stored in other portions of the OSS 130, as described in more detail below.

The channel source 1010 represents input data associated with user-entered event information. For example, when a user accesses the OSS 130 to perform some transaction, e.g., update a user profile, the process management system 310 receives the data via the network interface 320 and processes the data. In an exemplary implementation consistent with the present invention, the central engine 550 (FIG. 5) publishes an event on a channel, such as the channel corresponding to the channel source 1010. The transformer 1020 subscribes to the channel associated with the channel source 1010 and receives the event information.

The transformer 1020 may then identify the particular type of event received from the channel source 1010. For example, transformer 1020 determines what product or service that the event is associated with and whether the event is associated with a user modifying his/her profile associated with that particular service/product. The transformer 1020 may then determine how to format the data associated with the received event. The transformer 1020 may also invoke an ORB client process 1030 to connect to the redirect server 810. The ORB client 1030 may then transmit the re-formatted event information to the redirect server 810.

In accordance with an exemplary implementation of the invention, the transformer 1020 may also send the data to various channel targets 1040 subscribed to by other modules/external systems. For example, according to an exemplary implementation of the present invention, the transformer 1030 may forward event information to a channel subscribed to by a connector associated with the ODS 332, represented by channel target 1040. It should be understood that in other implementations of the invention, the ORB connector 532 may forward event information to channels associated with other modules/externals systems, based on the particular system requirements.

As described previously, the redirect server 810 stores information associated with a user/subscriber. The redirect server 810 may execute a redirect server process 1050 to facilitate the actual execution of the received event information from the ORB connector 532, as described in more detail below.

The redirect server 810 may also communicate with other systems via the process management system 310 before performing the desired operation associated with the received event. For example, the redirect server 810 may prepare a transaction for writing to the redirect server database 812. The redirect server 810, however, may wait for a "go ahead" indication from the ORB connector 532 before actually writing the data to its database. In this manner, the ORB connector 532 may essentially perform a 2-phase commit process associated with a received event to ensure that the actual data written to the redirect server database 812 is consistent with information in other databases of the OSS 130.

Figure 11:
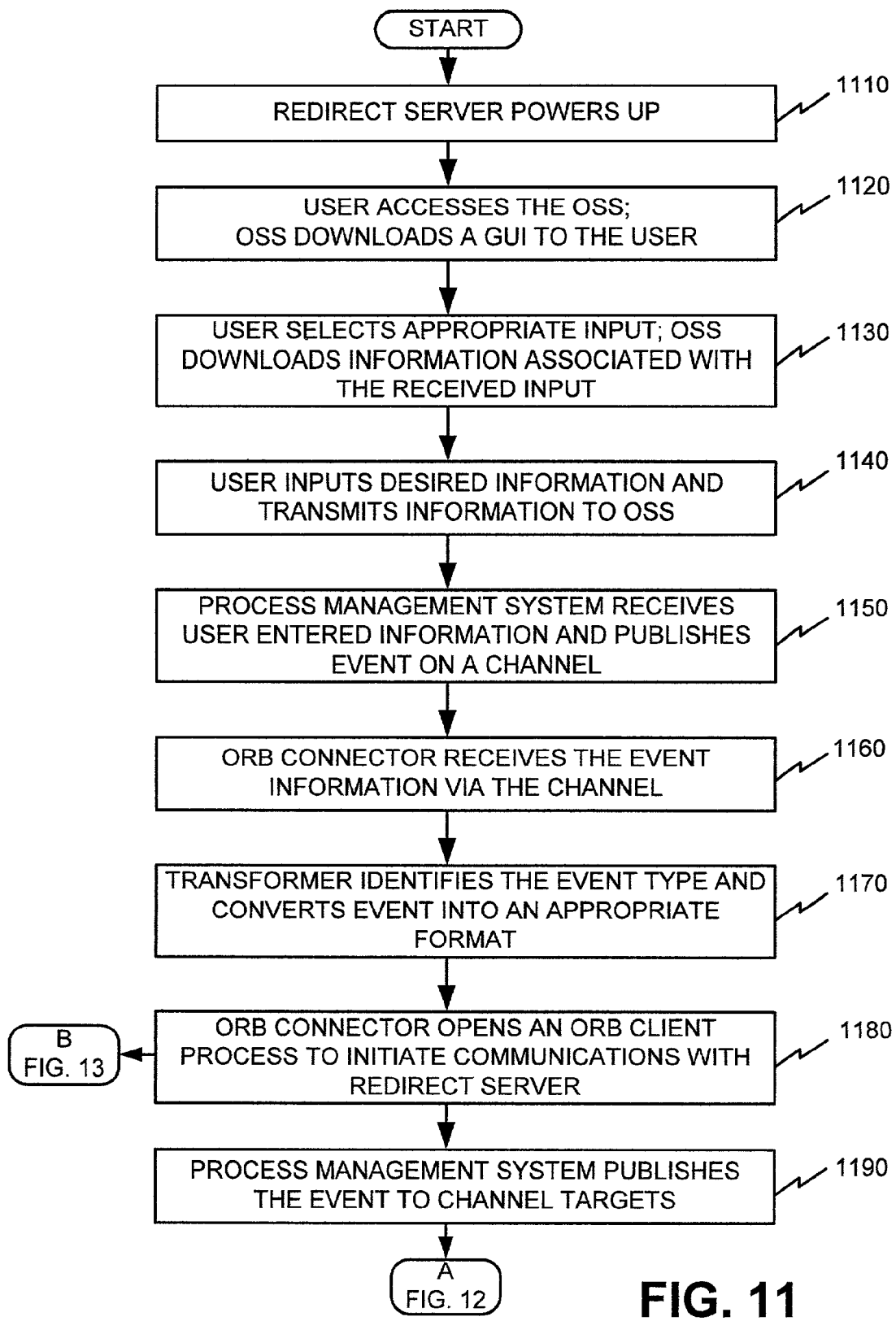
FIGS. 11–13 are flow diagrams illustrating exemplary processing by the OSS in an implementation consistent with the present invention.

FIG. 11 is a flow diagram, consistent with the present invention, illustrating exemplary processing associated with ORB connector 532. Processing may begin when the redirect server 810 powers up (act 1110). The redirect server 810 may generate an interoperable object reference (IOR) file upon start-up and send this file to the ORB connector 532, via the process management system 310. The ORB client 1030 receives the IOR file and uses the IOR file to reference the location and objects stored in the redirect server 810. The ORB client 1030 may use the IOR file as long as the redirect server 810 remains powered-up.

Processing may continue when a user accesses the OSS 130 (act 1120). For example, assume that the user wishes to change his/her IP address from which the user initiates or receives VoIP calls. In this case, the user may access the OSS 130 with a conventional user device 120 via network 110 (FIG. 1). The user may provide a user identification and/or password and network interface 320 may determine whether the user is authorized to access/modify various information stored in the OSS 130. Assuming that the user is authorized, the OSS 130 downloads a graphical user interface (GUI) to the user's particular user device 120 (act 1120). The GUI may include a number of options associated with the user's account. These options may include selections associated with modifying the user's profile, selections associated with receiving billing information, etc.

In the exemplary scenario, the user wishes to change his IP address. In this case, the user selects "customer configuration" or a similar graphic/text input and transmits the selection to the OSS 130 (act 1130). The OSS 130 receives the selection and downloads a customer configuration interface GUI to the user device 120 (act 1130). The GUI may also include pre-stored information associated with that user.

For example, the pre-stored information may indicate the user's IP address from which the user wishes to make/receive VoIP calls.

Assuming that the user wishes to change his IP address, the user selects "modify IP address" or a similarly labeled input on the GUI. The user may then input the desired modification and transmits the information to the OSS 130 (act 1140).

The process management system 310 receives the user-entered information, also referred to as an "event," via the network interface 320 (act 1150). The central engine 550 may then publish the event on a channel (act 1150).

In the example described above where the event is associated with updating an IP address, the central engine 550 publishes the event to a channel subscribed to by ORB connector 532, represented by channel source 1010 (FIG. 10). The ORB connector 532 then receives the event information (act 1160). In an exemplary implementation consistent with the present invention, the transformer 1020 extracts the event contents, which may be in the form of an extensible markup language (XML) string. The transformer 1020 identifies the event type based on the received information and converts the event information into an appropriate format based on the event type (act 1170). For example, in the scenario described above, the transformer 1020 may format the data for output to the redirect server 810.

The ORB connector 532 may also open ORB client 1030 to initiate communications with the redirect server 810 (act 1180). The ORB client 1030 may establish communications with the redirect server 810 via, for example, a method call using an Internet inter-orb protocol (IIOP). The ORB client 1030 establishes the semantics associated with communicating with the redirect server 810. For example, the ORB client 1030 may execute an interface definition language (IDL) file that defines the redirect server's 810 application programming interface (API). In an exemplary implementation of the present invention, the IDL file may be written in a language such as C++. Alternatively, the IDL file may be written in any language that provides CORBA bindings, such as C, Ada, Java, COBOL, Smalltalk, etc. The IDL may specify methods to connect, ping, obtain information, update information, delete information and disconnect to/from redirect server 810. In the event that ORB client 1030 is unable to establish communications with redirect server 810, the ORB connector 532 may queue the event, as described in more detail below with respect to FIG. 13. The discussion below with respect to FIGS. 11 and 12 assumes that the ORB client 1030 is able to establish communications with the redirect server 810.

Once the connection to the redirect server 810 is established, the ORB connector 532 manages and controls the transfer of data to the redirect server 810. In an exemplary implementation of the present invention, the data traveling from the ORB client 1030 to the redirect server 810 may be in the form of name value and name value sequence pairs. For example, a name value may include a field name and a field value and a name value sequence may include an array of the name value pairs. The ORB client 1030 may pass the name value and name value sequence pairs to the redirect server 810.

The transformer 1020 may also publish the event information to other channels, represented by channel target 1040 (act 1190). These channel targets may be associated with other external systems/connectors that may be involved in storing or processing information associated with the user's profile, such as the user's IP address. In the example above, the channel targets 1040 may include a channel subscribed to by ODS 332. In alternative implementations, the central engine 550 may publish the event to the channel target associated with ODS 332 at the same time that the event is published to the channel subscribed to by the ORB connector 532. It should also be understood that the event may be published to any particular channel target associated with another connector based on the particular system requirements.

In either case, the redirect server 810 receives the event information from ORB client 1030 and initiates an ORB server process 1050 to update the user's preference information (act 1210). Similarly, the ODS 332 also receives the event information via a connector designed to interface with this particular system (act 1210). For example, as described previously, ODS 332 may be an RDBMS. In this case, one of connectors 530 that is designed to communicate with an RDBMS may be utilized to establish communications with ODS 332.

According to an exemplary implementation, the redirect server process 1050 prepares the information to be written to the redirect server database 812 (act 1220). For example, the redirect server process 1050 may format the information according to rules associated with storing data in the redirect server database 812. The redirect server process 1050 may then determine whether the other external system(s) that is associated with the event has provided a "go ahead" message indicating that it has successfully received the event information and is prepared to make the necessary changes to its database (act 1230).

For example, when the ODS 332 has received the event information, the ODS 332 may provide a message to the redirect server 810, via the process management system 310, indicating that it has successfully received the event information and is prepared to make the appropriate updates.

If the redirect server process 1050 receives the message indicating that the ODS 332 received the event information, the redirect server process 1050 downloads the changes to the redirect server database 812 (act 1240). In an alternative implementation, the ODS 332 may provide a message to the redirect server 810, via the process management system 310, when it has received and stored the event information in its database.

In either case, if the redirect server process 1050 does not receive the go ahead indication from the ODS 332, the redirect server process 1050 may "roll back" the transaction to the point prior to receiving the event information from ORB client 1030 (act 1250). In other words, the redirect server process 1050 returns the redirect server 810 and redirect server database 812 to the state they were in prior to receiving the event information. In this manner, the redirect server process 1050 performs a 2-phase commit process. That is, the redirect server 810 performs all transactions associated with writing to the redirect server database 812 up to the point of actually storing the data in the redirect server database 812. The redirect server process 1050, however, does not commit the transaction to the redirect server database 812 until it receives an indication from the other relevant system(s) that it/they are also ready to make the necessary changes to its respective database(s). This enables the redirect server 810 to ensure that the event information will be implemented in all the proper systems/databases before the redirect server 810 commits the operation to the redirect server database 812, thereby maintaining consistency across the various systems in the OSS 130.

Figure 13:
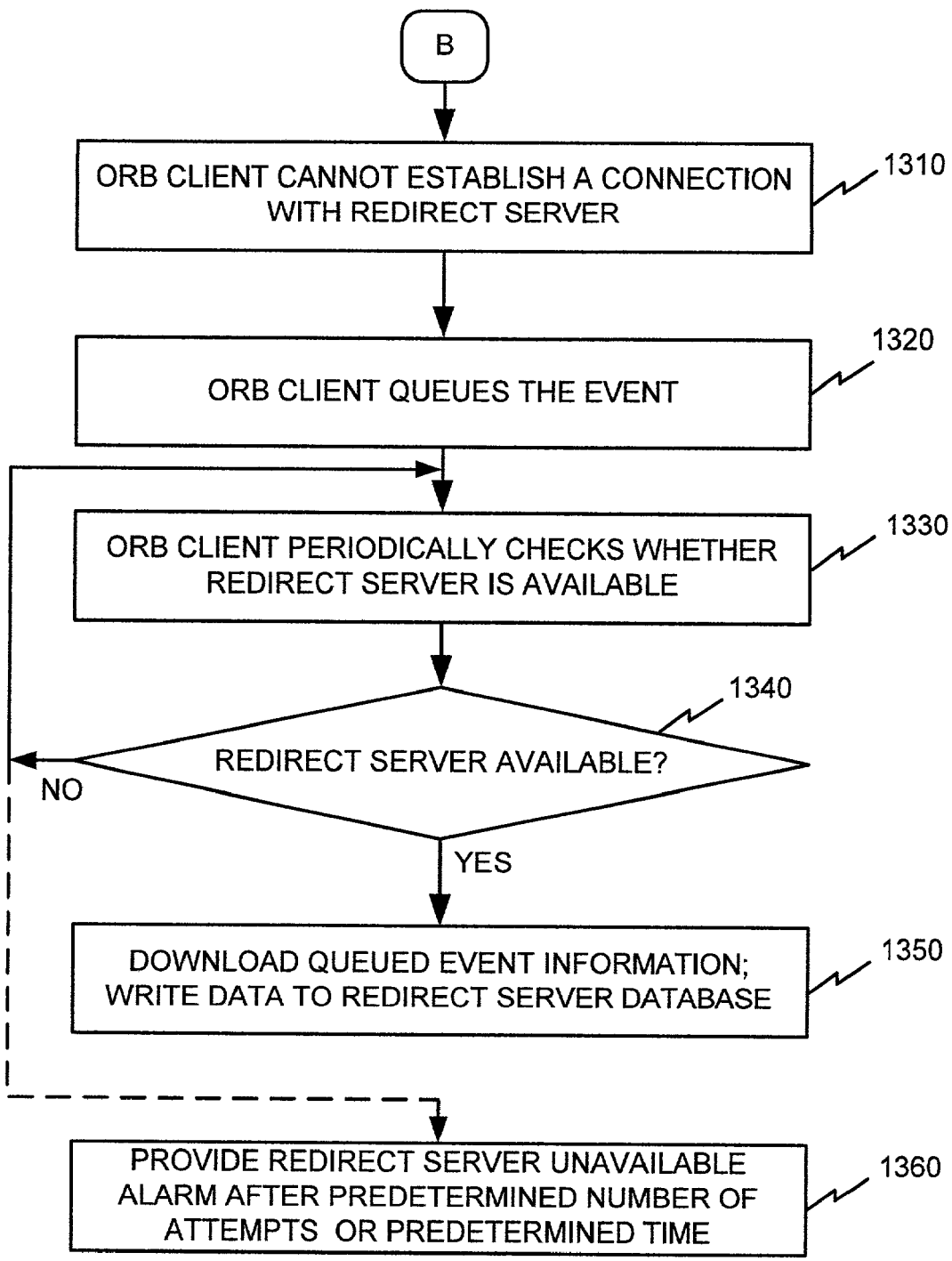

Implementations consistent with the present invention also provide a mechanism for establishing a connection between the ORB connector 532 and redirect server 810 333 after an initial attempt is unsuccessful. FIG. 13 is a flow diagram, consistent with the present invention, illustrating exemplary processing associated with establishing communications with redirect server 810. Assume that the ORB client 1030 cannot establish a connection with the redirect server 810 at act 1180 (act 1310). For example, assume that the redirect server 810 is offline, busy with another event, or generally unavailable. In this case, ORB client 1030 queues the event (act 1320).

The ORB client 1030 may also start a thread to check when the connection to the redirect server 810 can be made, i.e., determine when the redirect server 810 is available (act 1330). For example, the ORB client 1030 may open a new thread that periodically "pings" the redirect server 810 to determine whether the redirect server 810 is available (act 1340). If the redirect server 810 is not available, the ORB client 1030 may re-check the redirect server 810 every predetermined period of time. The predetermined period may be configurable. In addition, the ORB client 1030 may repeat this process until a positive response is received or may ping the redirect server 810 a configurable number of times.

When the redirect server 810 is available, the ORB client 1030 establishes the communication link to the redirect server 810 and downloads the queued event information to the redirect server 810 (act 1350). The redirect server 810 may then store the event information associated with a particular user in the redirect server database 812 (act 1350). It should be understood, however, that the other external system(s), such as the ODS 332, must also provide an indication that it has received the event information and is also ready to commit the desired update/deletion/modification in its database, as discussed above with respect to FIGS. 11 and 12. In this manner, the two systems, i.e., the redirect server database 812 and ODS 332, are updated at the same time. This ensures that the customer will receive the desired service. For example, coordinating the implementation of the user-entered information ensures that the customer will receive the desired VoIP service.

If the redirect server 810 is still unavailable after a predetermined period of time or after a predetermined number of attempts, the ORB client 1030 may provide an alarm message indicating that the redirect server 810 is unavailable (act 1360). This alarm may be sent to a device, such as fault management unit 335. In implementations consistent with the present invention, the ORB connector 532 may also provide information as to why the connection with the redirect server 810 cannot be established. For example, the ORB connector 532 may indicate that the redirect server 810 is offline.

The ORB connector 532, in implementations consistent with the present invention, may also signal the ODS 332, via process management system 310, to roll back the previous write operation. In this manner, the data across the OSS 130 remains consistent.

In another implementation consistent with the present invention, after the ORB connector 532 receives the event information at act 1160 (FIG. 11), the transformer 1020 may publish the event information to channel target 1040. Channel target 1040, as described previously, may be associated with ODS 332. In this case, a connector associated with the ODS 332 receives the event information and forwards the event information to the ODS 332.

The ODS 332 may then store the event information. If the ODS 332 is unable to store the event information due to a data related error (e.g., the user entered information is outside an accepted range) or an equipment problem (e.g., the ODS 332 is offline), the ODS 332 may send a signal back to the ORB connector 532. The ORB connector 532 may then send an error message back to the user. Assuming that the ODS 332 write operation is successful, the ODS 332 may send a message back to the process management system 310 indicating that the event data has been stored.

After the ORB connector 532 receives the acknowledgement that the ODS 332 successfully stored the data, the transformer 1020 invokes the ORB client 1030 to establish communications with the redirect server 810. Assuming that the ORB client 1030 is able to establish communications with the redirect server process 1050, the event information is then written to the redirect server database 812.

If the ORB client 1030 is unable to establish communications with the redirect server 810, the ORB client 1030 may queue the event. Processing may then continue as described previously with respect to FIG. 13. In this implementation, the ODS 332 receives and stores the event information before the event is forwarded to the redirect server 810.

If the ORB client 1030 is unable to establish communications with the redirect server 810 after a predetermined period of time or a predetermined number of attempts, the process management system 310 may signal the ODS 332 to roll back the previous write operation. In this manner, the data in the redirect server 810 and the ODS 332 remains consistent.

Systems and methods consistent with the present invention provide a flexible connection between a support system and a server executing an ORB to allow a user to add, modify and delete attributes associated with particular telecommunications services. An advantage of the invention is that the same connector can be use to provide connectivity to any other system that executes a CORBA compliant ORB. Another advantage of the invention is that the connector is fault tolerant. For example, when the redirect server 810 is unavailable, the ORB connector 532 includes provisions for retrying the connection. This results in a more flexible and reliable system.

A further advantage of the present invention is the system can be easily modified to support various vendors' equipment. For example, the ORB connector 532 described above essentially uses a two-tiered approach to connect with the redirect server 810. The first tier deals with the semantics of the physical connection and protocol between the ORB connector 532 and the target redirect server 810. The second tier described above in relation to the transformer process deals with transaction completion and fault tolerance. If the particular ORB vendor associated with the redirect server 810 changes, only the first tier of the connector needs to be modified to support this vendor. Therefore, the ORB connector 532 facilitates the integration of new systems that use CORBA compliant ORBs, thereby reducing development time and costs.

In this disclosure, there is shown and described only the preferred embodiments of the invention, but, as aforementioned, it is to be understood that the invention is capable of use in various other combinations and environments and is capable of changes or modifications within the scope of the inventive concept as expressed herein.

For example, the present invention has been described mainly in relation to a number of attributes associated with various services/products offered by a telecommunications service provider. It should be understood that the present invention may be used to support any additional features for which the user's attributes may be stored in a directory-based system. In addition, the present invention has been described mainly in relation to an integration platform associated with a telecommunications service provider. The present invention may also be used in other systems that include an integration platform that connects to various systems.

Figure 12:
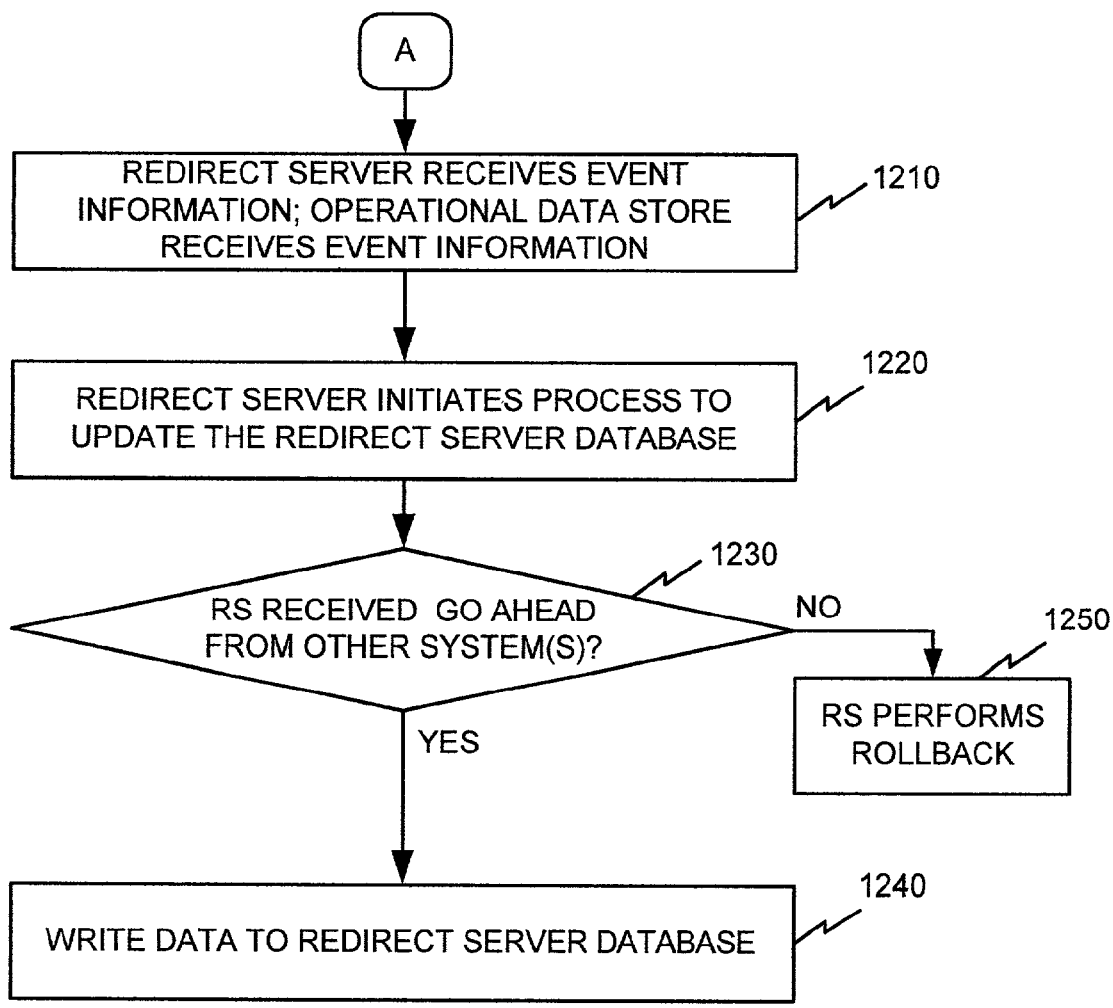

Lastly, aspects of the present invention have been described as series of acts in relation to FIGS. 11–13. It should be understood that the order of these acts may vary in other implementations of the present invention. Moreover, non-dependent acts may be performed in parallel.

No element, act or instruction used in the description of the present application should be construed as critical or essential to the invention unless explicitly described as such. Also, as used herein, the article "a" is intended to include one or more items. Where only one item is intended, the term "one" or similar language is used.

The scope of the invention is defined by the claims and their equivalents.

What is claimed is:

1. A computer-readable medium having stored thereon a plurality of sequences of instructions, said sequences of instructions including instructions which, when executed by a processor, cause the processor to:
   monitor an input channel for data associated with at least one of adding, deleting or modifying information stored in a server, the server executing an object request broker (ORB) that complies with common object request broker architecture (CORBA);
   receive the data associated with at least one of adding, deleting or modifying information stored in the server;
   forward the data to a data storage system;
   receive an indication that the data storage system stored the data;
   establish communications with the server in response to receiving the indication;
   format the data based on a type associated with the received data; and
   download the formatted data to the server.

2. The computer-readable medium of claim 1, wherein when forwarding the data to a data storage system, the instructions cause the processor to:
   forward event information associated with the received data to a channel subscribed to by the data storage system.

3. The computer-readable medium of claim 2, including instructions for causing the processor to:
   receive a first message from the data storage system when the data storage system was unable to store the data; and
   send a second message to the server in response to receiving the first message, the second message instructing the server to return the server to a state prior to when the server received the formatted data.

4. The computer-readable medium of claim 3, wherein the first message includes information indicating why the data storage system was unable to store the data and the instructions further cause the processor to:
   forward an error message to a user.

5. The computer-readable medium of claim 1, including instructions for causing the processor to:
   queue the event if communications with the server are not established;
   periodically attempt to establish communications with the server; and
   generate an alarm if communications with the server are not established after a predetermined number of attempts or after a predetermined period of time.

6. The computer-readable medium of claim 1, including instructions for causing the processor to:
   send a message to the data storage system if communications with the server cannot be established, the message instructing the data storage system to return the data storage system to a state prior to when the data storage system received the data.

7. The computer-readable medium of claim 1, wherein the data associated with at least one of adding, deleting or modifying information stored in the server comprises information associated with voice over Internet Protocol (VoIP) services.

8. The computer-readable medium of claim 7, wherein the VoIP services comprise at least one of call blocking, follow me, call forwarding, voice mail, conference calling, single line extension, call screening, quality of service, class of service, dial-plan restrictions, dynamic registration, secondary directory number or call transfer.

9. A support system, comprising:
   a memory configured to store an application program to integrate a number of hardware platforms; and
   a processor configured to execute the application program and:
   receive input data,
   transform the data into an appropriate format based on a type associated with the input data,
   output event information associated with the input data to a channel subscribed to by at least one connector,
   forward the data to at least one system,
   receive an indication that the at least one system has stored the data,
   establish communications with a redirect server in response to receiving the indication, the redirect server executing an object request broker (ORB) in accordance with common object request broker architecture (CORBA), and
   download the transformed data to the redirect server.

10. The support system of claim 9, wherein the at least one system comprises an operational data storage system.

11. The support system of claim 10, wherein the processor is further configured to:
   send a message to a user when the operational data storage system is unable to store the data.

12. The support system of claim 9, wherein the processor is further configured to:
   queue the event if communications with the redirect server cannot be established, and
   periodically attempt to establish communications with the redirect server.

13. The support system of claim 12, wherein the processor is further configured to:
   generate an alarm if communications with the redirect server are not established after a predetermined period of time or after a predetermined number of attempts.

14. The support system of claim 9, wherein the input data is associated with at least one of call blocking, follow me, call forwarding, voice mail, conference calling, single line extension, call screening, quality of service, class of service, dial-plan restrictions, dynamic registration, secondary directory number or call transfer.

15. A method for communicating from a first system to a first server, the first server executing an object request broker (ORB) that is common object request broker architecture (CORBA) compliant, the method comprising:

receiving user-entered information at the first system;

sending, by the first system, event information to a channel, the event information being based on the user-entered information and the channel being subscribed to by an ORB connector;

receiving, by the ORB connector, the event information;

transforming the event information to a format compatible with the first server;

establishing, by the ORB connector, communications with the first server, the first server controlling access to a first database;

downloading the transformed event information to the first server;

preparing, by the first server, to write the transformed event information to the first database;

determining, by the ORB connector, whether a message from a database system have been received; and signaling the first server to write the transformed event information to the first database when the message from the database system has been received.

16. The method of claim 15, further comprising: writing the transformed event information to the first database in response to the signaling.

17. The method of claim 15, wherein the first server comprises a redirect server and the sending includes:

sending the event information to a channel subscribed to by the database system.

18. The method of claim 17, further comprising:

signaling the redirect server to not write the transformed event information to the first database if the determining indicates that the database system has not received the event information.

19. The method of claim 15, further comprising:

queuing the event if the ORB connector is unable to establish communications with the first server; and periodically attempting to establish communications with the first server.

20. The method of claim 19, further comprising:

generating an alarm if communications with the first server are not established after a predetermined period of time or after a predetermined number of attempts.

21. The method of claim 15, wherein the user-entered information comprises information associated with at least one of updating information corresponding to a session initiation protocol service or requesting a new session initiation protocol service.

22. A software-based connector for interfacing between an integration platform and a server executing an object request broker (ORB) that is common object request broker architecture (CORBA) compliant, the connector comprising:

a transformer module configured to:

receive input information associated with at least one of a request to change attributes associated with a service or add a new service, output event information associated with the received input information to a channel subscribed to by a connector associated with an operational data storage system, and transform the input information into an appropriate format based on the request; and a client module configured to:

establish communications with the server, receive a message from the operational data storage system when the operational data storage system has received the event information, and download the transformed input information to the server after the message has been received.

23. The software-based connector of claim 22, wherein the client module is further configured to:

queue the transformed data if communications with the server cannot be established, and periodically attempt to establish communications with the server.

24. The software-based connector of claim 22, wherein the input information comprise information associated with, at least one of least one of call blocking, follow me, call forwarding, voice mail, conference calling, single line extension, call screening, quality of service, class of service, dial-plan restrictions, dynamic registration, secondary directory number or call transfer.

25. The software-based connector of claim 22, wherein the server comprises a redirect server that stores routing information associated with routing calls over an Internet Protocol communications network.

* * * * *